United States Patent [19]

Peterson

[11] 4,022,405
[45] May 10, 1977

[54] FAN LIFT-CRUISE V/STOL AIRCRAFT

[75] Inventor: John M. Peterson, LaJolla, Calif.

[73] Assignee: The United States of America as represented by the Secretary of the Navy, Washington, D.C.

[22] Filed: Mar. 25, 1976

[21] Appl. No.: 670,499

[52] U.S. Cl. .............................. 244/123; 244/12.5
[51] Int. Cl.² ........................................ B64C 15/04
[58] Field of Search .......... 244/12 B, 12 D, 23 BD, 244/52, 12.3, 12.5

[56] References Cited

UNITED STATES PATENTS

| 3,035,791 | 5/1962 | Klapproth | 244/12 D |
| 3,179,353 | 4/1965 | Peterson | 244/12 B |
| 3,258,206 | 6/1966 | Simonson | 244/120 D X |
| 3,335,976 | 8/1967 | Kappus | 244/12 B |
| 3,388,878 | 6/1968 | Peterson et al. | 244/12 B X |

Primary Examiner—Trygve M. Blix
Assistant Examiner—Barry L. Kelmachter
Attorney, Agent, or Firm—R. S. Sciascia; Roy Miller; T. W. Hennen

[57] ABSTRACT

An aircraft for making vertical and short field takeoffs is powered by a bypass turbofan engine having a core turbojet and a bypass fan. For vertical takeoffs, the efflux from the bypass fan is deflected downward to create lift. Exhaust from the core turbojet is ducted to turbine driven lifting fans at remote locations to create supplemental lifting forces which also provide aircraft control and stability. For cruise, the bypass fan efflux is discharged aft until sufficient forward airspeed is attained that exhaust gas flow to the lifting fans may be shut off, and exhaust gas flow may also be discharged aft.

5 Claims, 3 Drawing Figures

FAN LIFT-CRUISE V/STOL AIRCRAFT

BACKGROUND OF THE INVENTION

1. Field of the Invention

This invention pertains to lifting and propulsion systems in vertical and short takeoff and landing type aircraft. More particularly, this invention pertains to such systems wherein the power source is a bypass turbofan engine and where remote lifting fans are powered by turbojet exhaust while bypass fan efflux is vectored to provide lift or thrust.

2. Description of the Prior Art

Gas turbine powered aircraft for making vertical or short takeoffs and landings have used a variety of configurations. Some of such aircraft use one or more turbojet engines and vector the engine exhaust downward to create lift. Once airborne, these craft gradually vector the thrust aft until forward airspeed is sufficient to support the aircraft, at which point conventional aerodynamics take over. Other configurations have used remotely located lifting fans powered by compressor stage bleed air from the turbojet engines, or have ducted a mixture of compressor bleed air and turbojet exhaust gas to remotely located nozzles which discharge downward, thereby creating reaction lifting forces which lift and control the aircraft.

The critical period in the flight of a vertical and short takeoff and landing aircraft is at the transition between hover and forward flight. While forward airspeed is yet insufficient to support the aircraft, engine power used to lift the aircraft must be diverted to drive the aircraft forward, leaving less power available for sustaining altitude while forward airspeed increases. The present invention provides a means for gradually deflecting bypass fan efflux aft while maintaining altitude with a plurality of turbojet exhaust gas powered lifting fans, thereby enabling a smooth and controlled transition.

SUMMARY OF THE INVENTION

The vertical and short field takeoff aircraft of this invention utilizes a bypass turbofan engine comprising a core turbojet and a bypass fan for lifting and propulsion. The turbofan engine may utilize afterburning devices if desired for thrust augmentation. For vertical takeoff, the turbofan bypass air is deflected downward to create upward reaction forces which lift the aircraft, and the core turbojet exhaust is routed to remotely located lifting fans for additional lift and for stability and control. The turbojet exhaust gas powers the remotely located lifting fans by impinging upon the blades of a power turbine. The power turbine is located either axially with the lift fan or on tip turbine blades located on the periphery of the lift fan in a well known manner. The efflux from each lift fan is directed downward. Aircraft control while hovering may be maintained by either spoiling part of the lift in discrete amounts and ratios among the various lift fans, or exhaust gas can be transferred between various fans for causing fan thrust changes.

Transition to forward flight is performed by gradually deflecting bypass turbofan efflux aft while maintaining lift with the plurality of lifting fans. As aircraft forward velocity increases past the minimum maneuvering air speed, conventional aerodymanics take over and support the aircraft. At this point, exhaust gas flow to the lifting fans may be diverted to join the bypass fan efflux, and the combined flow may be directed aft for additional thrust. Low speed directional control while hovering may also be achieved by deflecting lift fan efflux to create lateral reaction forces. Also, exhaust gas flow to individual lift fans may be throttled to achieve better hovering control. As the lift fans are throttled down, a compensating nozzle increases to maintain a constant turbojet exhaust flow area, and this compensating nozzle mixes turbojet exhaust with bypass fan efflux.

BRIEF DESCRIPTION OF THE DRAWING

A complete understanding of the present invention may be gained from a consideration of the following detailed description presented herein below in connection with the accompanying drawings in which.

DETAILED DESCRIPTION OF AN EMBODIMENT

Figure 1:
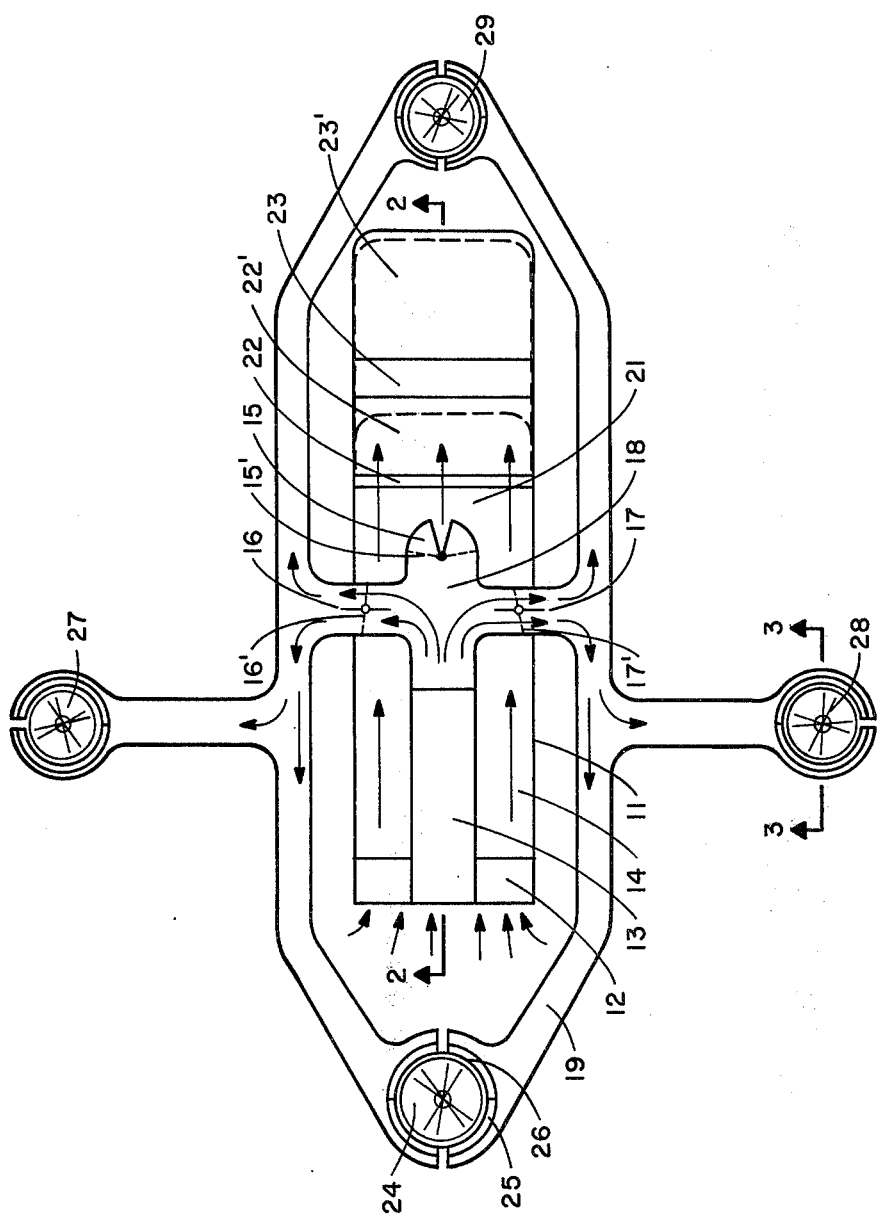
FIG. 1 is a schematic plan view of an aircraft according to this invention illustrating the lifting and propulsion system.

A vertical and short takeoff and landing aircraft is powered by a bypass turbofan engine in the manner shown schematically in the drawings. Referring now to the drawings wherein like reference numerals denote like parts and elements throughout the several views, there is shown in FIG. 1, bypass turbofan engine 11 having bypass fan 12 and core turbojet 13. Air drawn into bypass fan 12 is ducted along bypass fan duct 14 to the area immediately aft of bypass fan duct 14 and is discharged between movable gas turbine efflux deflectors 22 and 23. Of course, any number of efflux deflectors could be employed, and this invention is not limited to the use of two. High temperature, high pressure gas exhausting from turbojet 13 is ducted from the aft end or exhaust conducting tailpipe 18 of turbojet 13 to lifting fans 24, 27, 28 and 29 by exhaust gas duct 19.

Figure 3:
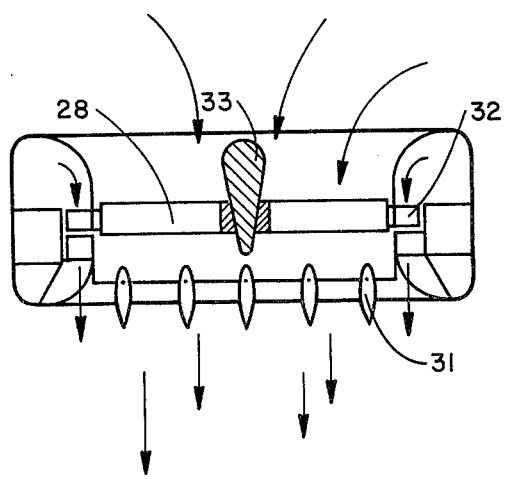
FIG. 3 is a schematic sectional side view along line 3—3 of FIG. 1.

The operation of each lifting fan is substantially identical to that of the others, and therefore only the operation of left lifting fan 28, which is shown in FIG. 3, and nose lifting fan 24 shown in FIG. 1, will be described. Exhaust gas reaching lifting fan 28 by way of exhaust gas duct 19, impinges peripheral turbine blades 32 on lifting fan 28 causing fan 28 to rotate rapidly. Lifting fan 28 draws in a large volume of low pressure air and discharges it downward, thereby creating a reaction lifting force. Vertical lifting fans having peripheral tubine blades, and which are powered by high pressure gas, such as lifting fans 24, 27, 28 and 29 are well known in the art.

Lift created by nose fan 24 may be regulated by controlling throttling means 25 and 26 to vary the amount of exhaust gas being supplied to fan 24. Vanes 31, shown directly below lifting fan 28 in FIG. 3, may be adjusted to deflect fan efflux to create a lateral reaction force. Also, vanes 31 may be used to spoil lift created by fan 28 by closing off the lower discharge area. Finally, the total lift produced by the fans may be controlled by throttling bypass turbofan engine 11. Of course, each fan may be equipped with controls such as throttling means 25 and 26, and vanes 31.

As throttling means 25 and 26 are adjusted to control the lift being produced by nose fan 24, and similarly as other throttling means on other lift fans are being adjusted, compensating nozzle 15 is automatically adjusted to maintain a constant turbojet exhuast nozzle flow area. That is, as throttling means 25 and 26 close to restrict the flow of exhaust through exhaust gas duct 19, into fan 24, compensating valve 15 opens slightly to offset the decreasing turbojet exhaust nozzle flow area. This is necessary for stable operation of turbojet 13. Finally, exhaust gas duct closure valves 16 and 17 may be operated to either proportion or restrict exhaust gas flow among the various lifting fans, and may close off flow entirely.

Figure 2:
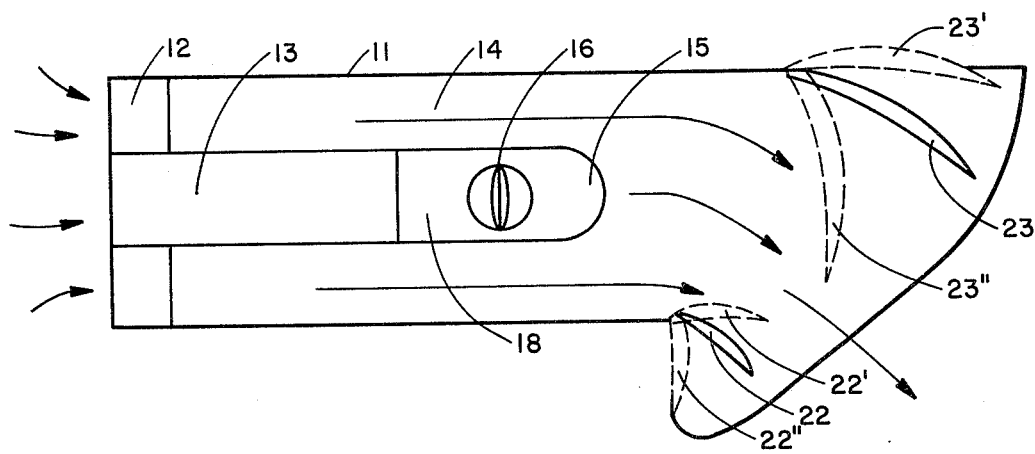
FIG. 2 is a schematic sectional side view along line 2—2 of FIG. 1.

In operation, turbofan engine 11 is started and core turbojet 13 exhaust gas is distributed by duct 19 to each of the respective lifting fans 24, 27, 28 and 29. At this time, compensating nozzle 15 is closed and exhaust gas duct closure valves 16 and 17 are open to permit full flow of exhaust gas to lifting fans 24, 27, 28 and 29. Also, gas turbine efflux discharge deflectors 22 and 23 are in the positions shown in FIG. 2 at 22'' and 23'' to deflect bypass fan efflux downward.

As the aircraft develops sufficient lift to raise off the ground, it begins moving upward. Stable hovering or directional maneuvering control is maintained by selectively throttling the various lift fans to create unbalanced moment forces about the aircraft center of mass, thereby producing pitching or rolling motions. Alternatively, vanes 31 may be used to directionally deflect lifting fan efflux or selectively spoil lift.

Vanes 31 on each lifting fan are pivotally attached and may be rotated to deflect fan efflux downwardly in either of two diametrically opposed lateral directions. They may also close off partially or entirely to spoil lift. The pivot axis of vanes 31 on opposing fans, fans 27 and 28 for example, may be aligned to deflect fan efflux laterally perpendicular to a line connecting the lift fan hubs 33. Fans 24 and 29 are aligned similarly. Yaw control may be accomplished by deflecting efflux from opposing fans in opposite directions to create a torque which rotates the aircraft about its yaw axis. Also, right-left or forward-aft hover maneuvering may be performed by deflecting the appropriate vanes on opposing fans in the same direction. Alternatively, vanes 31 may be mounted in a rotatable fixture so that any single lifting fan may produce any type of lateral control motion desired, simply by rotating that fan's vane pivot axis before deflecting vanes 31.

When the aircraft reaches a sufficient altitude for transition to forward flight, bypass fan efflux deflectors 22 and 23 are slowly moved toward positions 22' and 23'. This causes bypass fan efflux to be discharged rearward, creating a forward reaction thrust which accelerates the aircraft forward. The magnitude of this thrust gradually increases as deflectors 22 and 23 slowly move toward positions 22' and 23'. After deflectors 22 and 23 have reached position 22' and 23', and the aircraft has attained sufficient forward airspeed for conventional lifting surfaces to support it, exhaust gas duct closure valves 16 and 17 are closed to positions 16' and 17' to restrict exhaust gas flow to the lifting fans. Compensating nozzle 15 is then fully opened to position 15' to discharge exhaust gas from core turbojet 13 directly into bypass fan duct at 21. Exhaust gas thus discharged joins bypass fan efflux and is discharged aft, thereby adding to the forward thrust. At this time, a suitable afterburning device, not shown, may be employed in conjunction with turbojet 13 to further augment thrust of the propulsion system. After sufficient forward velocity is obtained to sustain altitude, skin fairings, not shown, may be employed to cover and streamline lifting fans 24, 27, 28 and 29 in order to reduce aerodynamic drag on the aircraft.

The procedure for landing is similiar to the procedure for taking off, only reversed. When landing, bypass fan efflux deflectors 22 and 23 are returned to the lowered positions 22'' and 23'', shown in FIG. 2, and conventional landing flaps, not shown, deployed to slow the forward motion of the aircraft. Skin fairings, which may be used to cover lifting fans while in forward flight, are withdrawn to expose lifting fans 24, 27, 28, and 29. Exhaust gas duct closure valves 16 and 17 are opened while compensating valve 15 is closed to distribute core turbojet exhaust gas to each of lifting fans 24, 27, 28 and 29. As the lifting fans come up to speed and begin producing lift, vanes 31 are angled to deflect fan efflux forward, further slowing the forward motion of the aircraft. When the forward motion of the aircraft has been reduced to near zero, vanes 31 are neutralized, and bypass turbofan engine 11 is throttled back slightly to reduce the amount of lift being produced by the fans and deflected bypass fan efflux. The aircraft slowly descends until it reaches the ground.

In general, altitude control while in the hover mode may be achieved by throttle control of bypass turbofan engine 11, or by balanced throttle control of the individual lifting fans, and may be coupled with lift degradation achieved by overexpansion of bypass fan efflux and exhaust gas from compensating nozzle 15. Expansion of these compressed gases is influenced by the specific area and contour of the gas turbine efflux discharge port defined by the position of efflux deflectors 22 and 23. The position taken by deflectors 22 and 23 defines the discharge area, and by controlling this area, overexpansion may be made to occur.

In the configuration of this invention shown in the drawing figures, pitch and roll control are achieved by differentially controlling lifting thrust between opposing lift fans. That is, for pitch control, fans 24 and 29 are employed. If pitch up is required, lift from fan 24 is increased, or lift from fan 29 decreased, or both. Roll control is similarly achieved by differentially controlling the lift produced by fans 27 and 28. Selective throttling by means of throttles 25 and 26 or selective lift spoilage by means of vanes 31 are some of the methods of accomplishing such differential control.

Obviously many modifications and variations of the present invention are possible in light of the above teachings. It is therefore to be understood that within the scope of the appended claims the invention may be practiced otherwise than as specifically described.

What is claimed is:

1. A propulsion system for use in an aircraft for making vertical and short takeoffs and landings comprising:
   at least one gas turbine engine having a core turbojet, a bypass fan, and a turbojet exhaust gas conducting tailpipe;
   a plurality of lifting fans, each fan having spoiling means to selectively spoil lift;
   exhaust gas duct extending from said exhaust gas conducting tailpipe to each of said lifting fans for communicating turbojet exhaust gas from said turbojet to said lifting fans for powering said lifting fans;
   said exhaust gas duct being divided into two major independent branches, each of said branches supplying a forward fan, an aft fan, and a side fan of said plurality of fans;

exhaust gas duct closure means operative to selectively restrict exhaust gas flow through each of said branches;

a compensating nozzle attached to said exhaust gas conducting tailpipe and operative to maintain a predetermined total exhaust gas flow from said turbojet in response to changes in exhaust gas flow through said exhust gas duct branches;

bypass fan duct extending from said bypass fan and defining a gas turbine efflux discharge port for communicating bypass fan efflux therebetween; and deflection means pivotally retained within said discharge port for vectoring gas turbine efflux.

2. The aircraft propulsion system of claim 1 wherein said lifting fans comprise tip turbine blades for extraction power from high pressure gas.

3. The aircraft propulsion system of claim 1 wherein said deflection means comprises at least one control surface which is pivotable between first and second positions.

4. The aircraft propulsion system of claim 1 wherein said lifting fans are disposed upon said aircraft to produce an upward lifting force which is balanced about aircraft pitch and roll axes.

5. The aircraft propulsion system of claim 1 wherein said spoiling means also comprise lifting fan efflux deflection means for producing laterally directed reaction forces for controlling aircraft lateral motion.

* * * * *